US012670021B2

(12) United States Patent
Kim

(10) Patent No.: US 12,670,021 B2
(45) Date of Patent: Jun. 30, 2026

(54) METHOD AND APPARATUS FOR TASK SCHEDULING FOR ACCELERATOR POOL

(71) Applicant: ELECTRONICS AND TELECOMMUNICATIONS RESEARCH INSTITUTE, Daejeon (KR)

(72) Inventor: Seon-Young Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 409 days.

(21) Appl. No.: 18/242,097

(22) Filed: Sep. 5, 2023

(65) Prior Publication Data

US 2024/0095070 A1 Mar. 21, 2024

(30) Foreign Application Priority Data

Sep. 21, 2022 (KR) ........................ 10-2022-0119383
Jul. 14, 2023 (KR) ........................ 10-2023-0091853

(51) Int. Cl.
*G06F 9/48* (2006.01)
*G06F 9/50* (2006.01)

(52) U.S. Cl.
CPC .......... *G06F 9/4893* (2013.01); *G06F 9/5027* (2013.01); *G06F 2209/5011* (2013.01); *G06F 2209/5022* (2013.01)

(58) Field of Classification Search
CPC ................. G06F 9/4893; G06F 9/5027; G06F 2209/5011; G06F 2209/5022; G06F 9/5044; G06F 9/5094
See application file for complete search history.

(56) References Cited

U.S. PATENT DOCUMENTS

| | | | |
|---|---|---|---|
| 8,874,943 B2 | 10/2014 | Majumdar et al. | |
| 9,804,903 B2 | 10/2017 | Kim et al. | |
| 10,909,054 B2 | 2/2021 | Subbanna et al. | |
| 10,983,835 B2 | 4/2021 | Kim et al. | |
| 2016/0299553 A1* | 10/2016 | Putnam | G06F 1/3293 |
| 2018/0102953 A1* | 4/2018 | Mahindru | H04L 43/0817 |
| 2020/0218548 A1* | 7/2020 | Wan | H04W 52/0203 |
| 2021/0149736 A1* | 5/2021 | Kondapuram | G06F 9/4893 |
| 2021/0150413 A1* | 5/2021 | Bayat | G06N 3/0464 |
| 2021/0182066 A1 | 6/2021 | Shenoy et al. | |

(Continued)

FOREIGN PATENT DOCUMENTS

| | | |
|---|---|---|
| KR | 10-2011-0128023 A | 11/2011 |
| KR | 10-2020-0068548 A | 6/2020 |

(Continued)

*Primary Examiner* — Peng Ke
(74) *Attorney, Agent, or Firm* — LRK PATENT LAW FIRM

(57) ABSTRACT

Disclosed herein is a method for task scheduling for an accelerator pool. The method includes receiving state information of an accelerator in the accelerator pool, generating a list of accelerators capable of being assigned a task based on the state information, calculating the amount of additional power that is to be consumed when the task is assigned to each of the accelerators in the list, and assigning the task to an accelerator in consideration of the calculated amount of additional power to be consumed and conductive heat between accelerators.

10 Claims, 6 Drawing Sheets

(56)                 References Cited

U.S. PATENT DOCUMENTS

2021/0318902 A1 * 10/2021 Uemura ................ G06F 9/5044
2022/0237040 A1 * 7/2022 Shin ....................... G06N 3/098

FOREIGN PATENT DOCUMENTS

| KR | 10-2145795 | B1 | 8/2020 |
| KR | 10-2020-0125389 | A | 11/2020 |
| KR | 10-2022-0086449 | A | 6/2022 |
| KR | 10-2022-0107621 | A | 8/2022 |
| KR | 10-2022-0108089 | A | 8/2022 |

* cited by examiner

| $\Delta P$ | | ACCELERATOR 1 | ACCELERATOR 2 | ACCELERATOR 3 | ACCELERATOR 4 | ACCELERATOR 5 |
|---|---|---|---|---|---|---|
| | 1st ALLOCATION | 50W | 80W | 70W | 50W | 40W ⊘ |
| | 2nd ALLOCATION | 50W | 80W | 70W | 50W | 20W ⊘ |
| | 3rd ALLOCATION | 50W ⊘ | 80W | 70W | 50W ⊗ | X |
| | ⋮ | ⋮ | ⋮ | ⋮ | ⋮ | ⋮ |
| | Nth ALLOCATION | X | X | X | X | X |

610

620

| COMMUNICATION UNIT | → | TASK ASSIGNMENT UNIT |
|---|---|---|

METHOD AND APPARATUS FOR TASK SCHEDULING FOR ACCELERATOR POOL

CROSS REFERENCE TO RELATED APPLICATIONS

This application claims the benefit of Korean Patent Applications No. 10-2022-0119383, filed Sep. 21, 2022, and No. 10-2023-0091853, filed Jul. 14, 2023, which are hereby incorporated by reference in their entireties into this application.

BACKGROUND OF THE INVENTION

1. Technical Field

The present disclosure relates to a task scheduling method for accelerators for reducing heat generation and power consumption of a heterogeneous accelerator pool in a data center.

More particularly, the present disclosure relates to a method for assigning a task in consideration of the temperature and utilization of an accelerator, an estimate of power to be additionally consumed by the accelerator when a task is assigned thereto, and the physical location of the accelerator for a heterogeneous accelerator pool in a data center.

2. Description of Related Art

With the recent rapid increase in demand for compute- and data-intensive tasks represented by deep learning, demand for High-Performance Computing (HPC) infrastructure is also increasing. In order to meet the demand for HPC infrastructure, large-scale data centers, each containing a huge number of computing nodes, are being operated all over the world.

Tasks frequently processed in data centers, such as deep learning, are mostly formed of simple operations such as Multiply-and-Accumulate (MAC) operations, but because the number of operations is very large, parallel operation units are suitable to process such operations. Therefore, Graphic Processing Unit (GPU) accelerators, each having a large number of low-performance cores, or Field-Programmable Gate Array (FPGA) or Application-Specific Integrated Circuit (ASIC) accelerators designed to be optimized for tasks, rather than a Central Processing Unit (CPU) with a small number of high-performance cores, are receiving attention as operation units for data centers.

Accordingly, recent data centers have adopted a hybrid architecture so as to equip computing nodes with an accelerator pool including GPU, FPGA, and ASIC accelerators along with a CPU corresponding to a main processor, thereby effectively processing tasks requiring a high degree of parallel operations. Such an accelerator pool contains different types of accelerators, such as GPU, FPGA, and ASIC accelerators, and even though the accelerators are of the same type, they have heterogeneous structures based on different specifications.

In order to operate a data center formed of high-performance computing nodes equipped with an accelerator pool, a massive amount of power is consumed. According to a survey, data centers in the United States consumed an estimated 70 billion kWh of power in 2014, which accounts for about 1.8% of total power consumption in the United States that year. Also, as the data centers have become larger and the performance of computing nodes therein has been more improved, the amount of power consumed by the data centers is estimated to be higher than before.

Meanwhile, low-carbon green growth policies triggered by recent climate crisis are actively carried out worldwide, and this movement is also affecting data centers, which consume massive amounts of power. In practice, green data centers designed with low-power, environment-friendly facilities in mind are being adopted around the world, and South Korea also has introduced a green data center certification system, thereby actively participating in the low-carbon green growth movement. As described above, reducing power consumption by data centers is recognized as an important issue.

In a data center, power consumed by operation units, such as CPUs and the like, accounts for 36 to 44% of total power consumed in the data center. Such high power consumption in the operation units leads to massive amounts of heat generation, which causes an increase in the temperature of the operation units. The high temperature of the operation units may cause not only additional power consumption due to a rise in the static power consumption of the operation units but also temporary malfunction or permanent damage. Therefore, in order to manage the temperature of computing nodes, data centers adopt various types of mechanical cooling solutions, ranging from air/water coolers to air conditioners.

However, such mechanical cooling solutions also consume a large amount of power, which accounts for 38 to 50% of total power consumption by a data center. Accordingly, data centers apply a method for thermal management at the level of software, such as an Operating System (OS), along with the mechanical cooling solutions, thereby aiming at reducing power consumption based on the mechanical cooling solution. As representative software-level thermal management methods, there are a task-scheduling-based thermal management method, which appropriately assigns tasks in consideration of heat generation, a thermal management method based on Dynamic Voltage and Frequency Scaling (DVFS), which dynamically adjusts the power and frequency of operation units depending on the temperature of the operation units, and the like.

The software-level thermal management methods currently applied in data centers are focused on CPUs. Software-level thermal management methods for accelerators are limitedly applied to GPU accelerators, but there is no software-level thermal management method for FPGA or ASIC accelerators. This is because the amount of heat generation by an FPGA or ASIC that has ever been used is controllable by low-power air coolers.

However, the recently released high-end commercial FPGAs with built-in AI acceleration engines cause heat generation equivalent to that caused by CPUs for servers, and ASICs may also cause a high-level of heat generation based on the user's design. However, cooling an FPGA or ASIC accelerator still depends on the use of air coolers, and power consumption for cooling solutions rapidly increases with an increase in the amount of power consumed by the accelerators. Also, as computing capability required for computing nodes increases, the number of accelerators installed in a single computing node increases, whereby the amount of power consumed by the accelerators accounts for an increasing proportion of the total power consumption by the computing node. As the amount of power consumed by the accelerators are rapidly increasing, the need to apply the software-level thermal management method to FPGA or ASIC accelerators arises in order to reduce power consumption.

In order to reduce the amount of power consumed by accelerators in data centers, not only a software-level thermal management method for a single accelerator but also a thermal management method in an accelerator pool, which is configured to operate the accelerators in the data center, are required. Also, a software-level thermal management method for such an accelerator pool is expected to show optimum efficiency only when the method is designed taking into account the fact that the accelerator pool is a pool of heterogeneous accelerators.

DOCUMENTS OF RELATED ART (Patent Document 1) Korean Patent Application Publication No. 10-2020-0068548, titled "Apparatus and method for determining allocation rate of accelerator based on parallel computing".

SUMMARY OF THE INVENTION

An object of the present disclosure is to provide a task-scheduling method for assigning tasks in consideration of the temperature and utilization of an accelerator, an estimate of power to be additionally consumed by the accelerator when a task is assigned thereto, and the physical location of the accelerator in order to reduce heat generation and power consumption by a heterogeneous accelerator pool in a data center.

In order to accomplish the above object, a method for task scheduling for an accelerator pool according to an embodiment of the present disclosure includes receiving state information of an accelerator in the accelerator pool, generating a list of accelerators capable of being assigned a task based on the state information, calculating an amount of additional power that is to be consumed when the task is assigned to each of the accelerators in the list, and assigning the task to an accelerator in consideration of the calculated amount of additional power to be consumed and conductive heat between accelerators.

Here, the state information may include the logic utilization of the accelerator, an operating voltage, a clock, and temperature information.

Here, the amount of additional power to be consumed may be estimated using the state information of the accelerator and task information.

Here, generating the list of accelerators may comprise suspending task assignment until the logic utilization of the accelerator or the temperature of the accelerator decreases to be equal to or less than a preset value when an accelerator capable of being assigned the task is not present.

Here, assigning the task to the accelerator may comprise assigning the task to an accelerator for which the calculated amount of additional power to be consumed is equal to or less than a preset value and assigning the task to an accelerator physically farthest from an accelerator having the highest temperature in the accelerator pool when there are multiple accelerators for which the amount of additional power to be consumed is equal to or less than the preset value.

Here, assigning the task to the accelerator may comprise assigning the task to an accelerator for which the calculated amount of additional power to be consumed is equal to or less than a preset value and assigning the task in consideration of the conductive heat generated between accelerators in the accelerator pool.

Here, the accelerator pool may include different types of accelerators.

Also, in order to accomplish the above object, an apparatus for task scheduling for an accelerator pool according to an embodiment of the present disclosure includes a communication unit for receiving state information of an accelerator in the accelerator pool and a task assignment unit for generating a list of accelerators capable of being assigned a task based on the state information, calculating the amount of additional power that is to be consumed when the task is assigned to each of the accelerators in the list, and assigning the task to an accelerator in consideration of the calculated amount of additional power to be consumed and conductive heat between accelerators.

Here, the state information may include the logic utilization of the accelerator, an operating voltage, a clock, and temperature information.

Here, the amount of additional power to be consumed may be estimated using the state information of the accelerator and task information.

Here, the task assignment unit may suspend task assignment until the logic utilization of the accelerator or the temperature of the accelerator decreases to be equal to or less than a preset value when an accelerator capable of being assigned the task is not present.

Here. the task assignment unit may assign the task to an accelerator for which the calculated amount of additional power to be consumed is equal to or less than a preset value, and may assign the task to an accelerator physically farthest from an accelerator having the highest temperature in the accelerator pool when there are multiple accelerators for which the amount of additional power to be consumed is equal to or less than the preset value.

Here, the task assignment unit may assign the task to an accelerator for which the calculated amount of additional power to be consumed is equal to or less than a preset value, and may assign the task in consideration of the conductive heat generated between accelerators in the accelerator pool.

Here, the accelerator pool may include different types of accelerators.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

Figure 1:
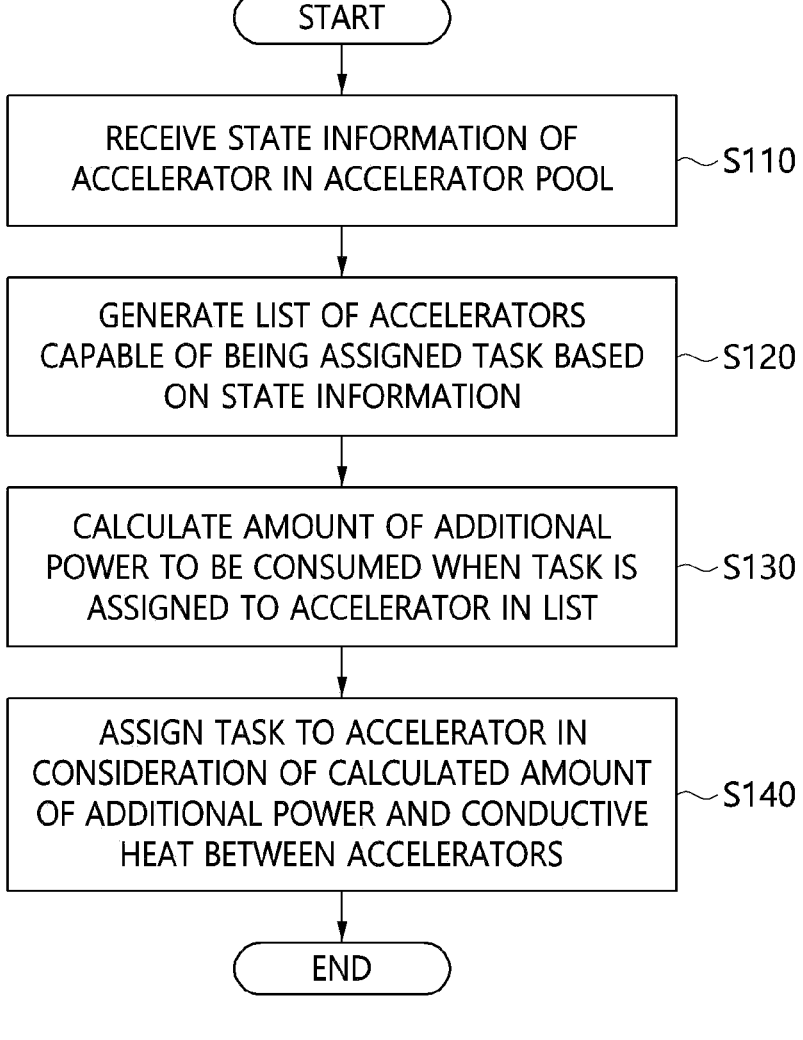
FIG. 1 is a flowchart illustrating a method for task scheduling for an accelerator pool according to an embodiment of the present disclosure.

The advantages and features of the present disclosure and methods of achieving them will be apparent from the following exemplary embodiments to be described in more detail with reference to the accompanying drawings. However, it should be noted that the present disclosure is not limited to the following exemplary embodiments, and may be implemented in various forms. Accordingly, the exemplary embodiments are provided only to disclose the present disclosure and to let those skilled in the art know the category of the present disclosure, and the present disclosure is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present disclosure.

The terms used herein are for the purpose of describing particular embodiments only and are not intended to limit the present disclosure. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

In the present specification, each of expressions such as "A or B", "at least one of A and B", "at least one of A or B", "A, B, or C", "at least one of A, B, and C", and "at least one of A, B, or C" may include any one of the items listed in the expression or all possible combinations thereof.

Unless differently defined, all terms used herein, including technical or scientific terms, have the same meanings as terms generally understood by those skilled in the art to which the present disclosure pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, embodiments of the present disclosure will be described in detail with reference to the accompanying drawings. In the following description of the present disclosure, the same reference numerals are used to designate the same or similar elements throughout the drawings, and repeated descriptions of the same components will be omitted.

FIG. 1 is a flowchart illustrating a method for task scheduling for an accelerator pool according to an embodiment of the present disclosure.

The method for task scheduling for an accelerator pool according to an embodiment of the present disclosure may be performed by a task-scheduling apparatus.

Referring to FIG. 1, the method for task scheduling for an accelerator pool according to an embodiment of the present disclosure includes receiving state information of an accelerator in the accelerator pool at step S110, generating a list of accelerators capable of being assigned a task based on the state information at step S120, calculating the amount of additional power that is to be consumed when the task is assigned to each of the accelerators in the list at step S130, and assigning the task to an accelerator in consideration of the calculated amount of additional power to be consumed and conductive heat between the accelerators at step S140.

Here, the state information may include the logic utilization of the accelerator, an operating voltage, a clock, and temperature information.

Here, the amount of additional power to be consumed may be estimated using the state information of the accelerator and task information.

Here, generating the list of accelerators at step S120 may comprise suspending task assignment until the logic utilization or temperature of the accelerator decreases to be equal to or less than a preset value when an accelerator capable of being assigned the task is not present.

Here, assigning the task to the accelerator at step S140 may comprise assigning the task to an accelerator for which the calculated amount of additional power to be consumed is equal to or less than a preset value and assigning the task to an accelerator physically farthest from the accelerator having the highest temperature in the accelerator pool when there are multiple accelerators for which the amount of additional power to be consumed is equal to or less than the preset value.

Here, assigning the task to the accelerator at step S140 may comprise assigning the task to an accelerator for which the calculated amount of additional power to be consumed is equal to or less than a preset value and assigning the task in consideration of conductive heat generated between accelerators in the accelerator pool.

Here, the accelerator pool may include different types of accelerators.

Figure 2:
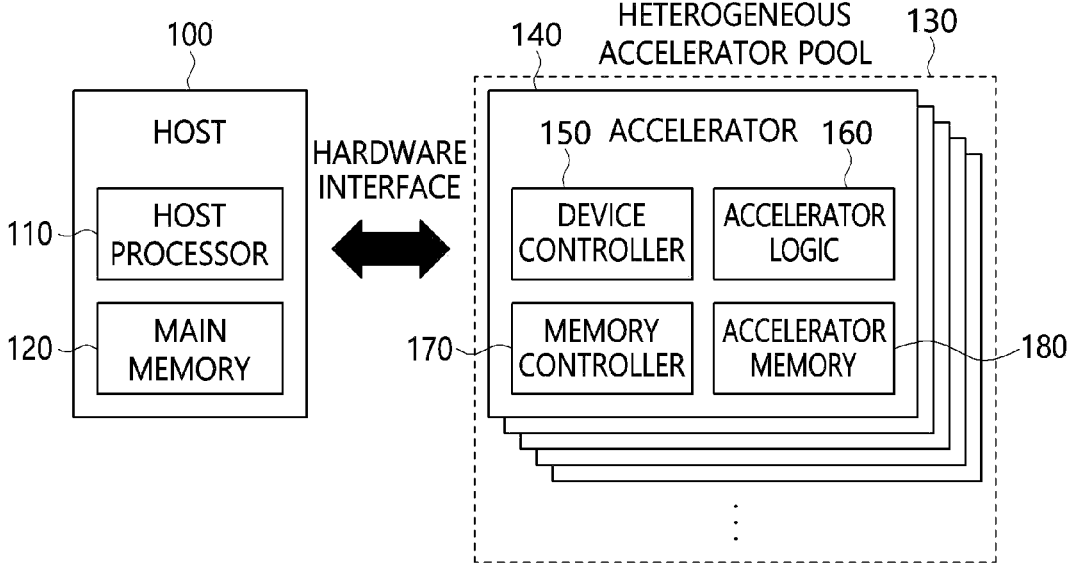
FIG. 2 is an example of the structure of a system including a heterogeneous accelerator pool.

FIG. 2 is an example of the structure of a system including a heterogeneous accelerator pool.

Referring to FIG. 2, the system including a heterogeneous accelerator pool may include a host 100 for managing a heterogeneous accelerator pool 130 and assigning a task and the heterogeneous accelerator pool 130 including different types of accelerators.

The host 100 may include a host processor 110 and main memory 120. When a task to be assigned to the heterogeneous accelerator pool 130 is generated, the host processor 110 may assign the task to a specific accelerator based on the task-scheduling method of the present disclosure. The host processor 110 may interface with an accelerator 140 included in the heterogeneous accelerator pool 130 through a hardware interface such as Peripheral Component Interconnect express (PCIe) or Cache-Coherent Interconnect for Accelerators (CCIX).

The heterogeneous accelerator pool 130 may include different types of accelerators 140 such as GPU/FPGA/ASIC accelerators, and the like. Each of the accelerators 140 included in the heterogeneous accelerator pool may include a device controller 150 for controlling the accelerator and interfacing with the host, accelerator logic 160 for processing a task, a memory controller 170 for controlling accelerator memory, and the accelerator memory 180 in which data to be used by the accelerator logic is stored.

The accelerator pool in an embodiment of the present disclosure is assumed to be a heterogeneous accelerator pool including different types of accelerators, but the scope of the present disclosure also includes a homogeneous accelerator pool including the same type of accelerators, without limitation to the heterogeneous accelerator pool, and the task-scheduling method of the present disclosure may be applied to both the homogenous accelerator pool and the heterogeneous accelerator pool.

Figure 3:
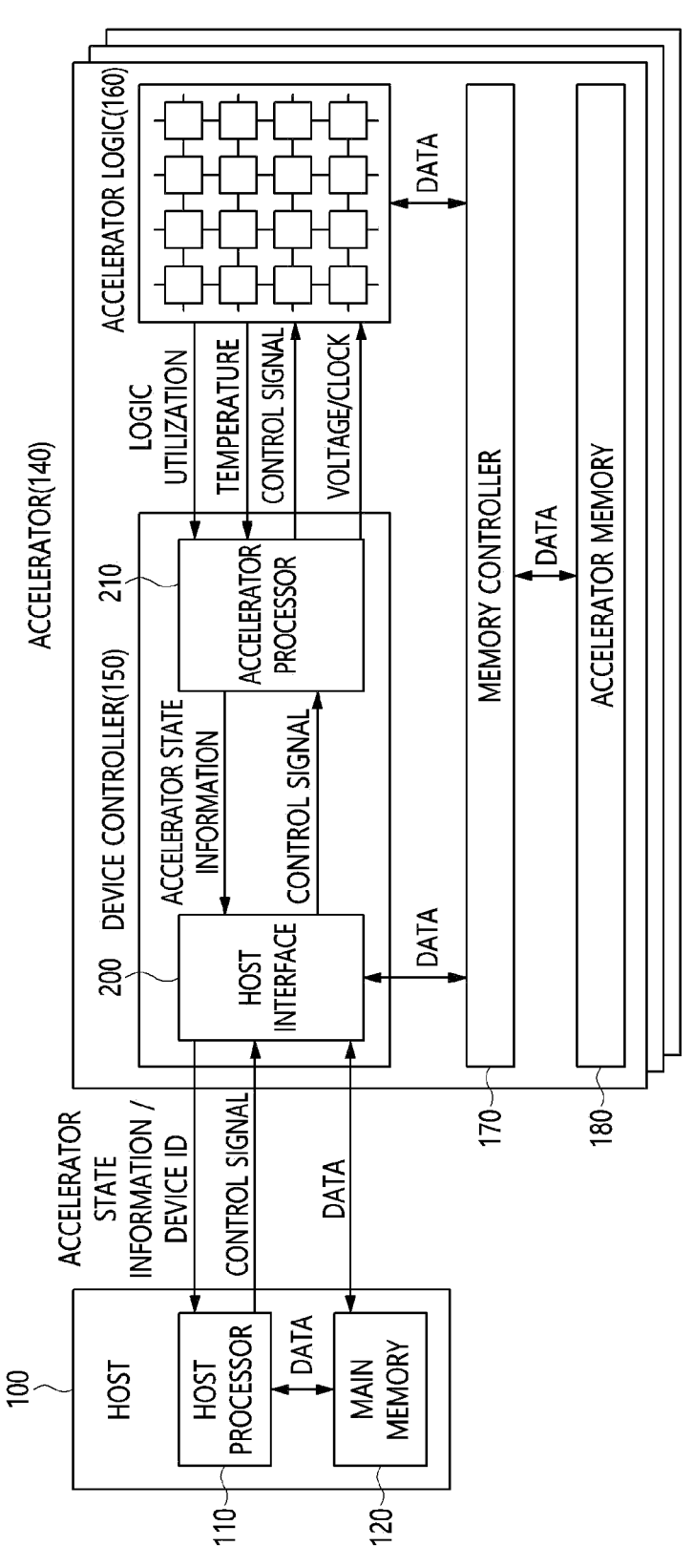
FIG. 3 is an example of the structure of an accelerator included in a heterogeneous accelerator pool and a method for communication between the accelerator and a host.

FIG. 3 is an example of the structure of an accelerator included in a heterogeneous accelerator pool and a method for communication between the accelerator and a host.

Referring to FIG. 3, the task-scheduling method of the present disclosure may be implemented in various types of accelerators, such as GPU/FPGA/ASIC accelerators, and the like. Here, the structure of an accelerator 140 does not deviate from the structure of general accelerators.

The host interface 200 of the accelerator 140 may serve as the interface between a host 100 and the accelerator 140. Specifically, the host interface 200 may receive state information, such as the logic utilization of accelerator logic 160, an operating voltage, a clock, the temperature, and the like, from an accelerator processor 210 and transfer the same to the host 100, or may receive data, control signals, and the like from the host 100 and transfer the same to a destination inside the accelerator 140. The host interface 200 may be implemented based on a general-purpose interface controller (a PCIe controller or the like).

The accelerator processor 210 may monitor the logic utilization of the accelerator logic 160 and the temperature thereof at regular intervals and transfer the same to the host interface 200. Also, the accelerator processor 210 may control the accelerator logic 160 through a control signal received from a host processor 110 via the host interface 200.

Figure 4:
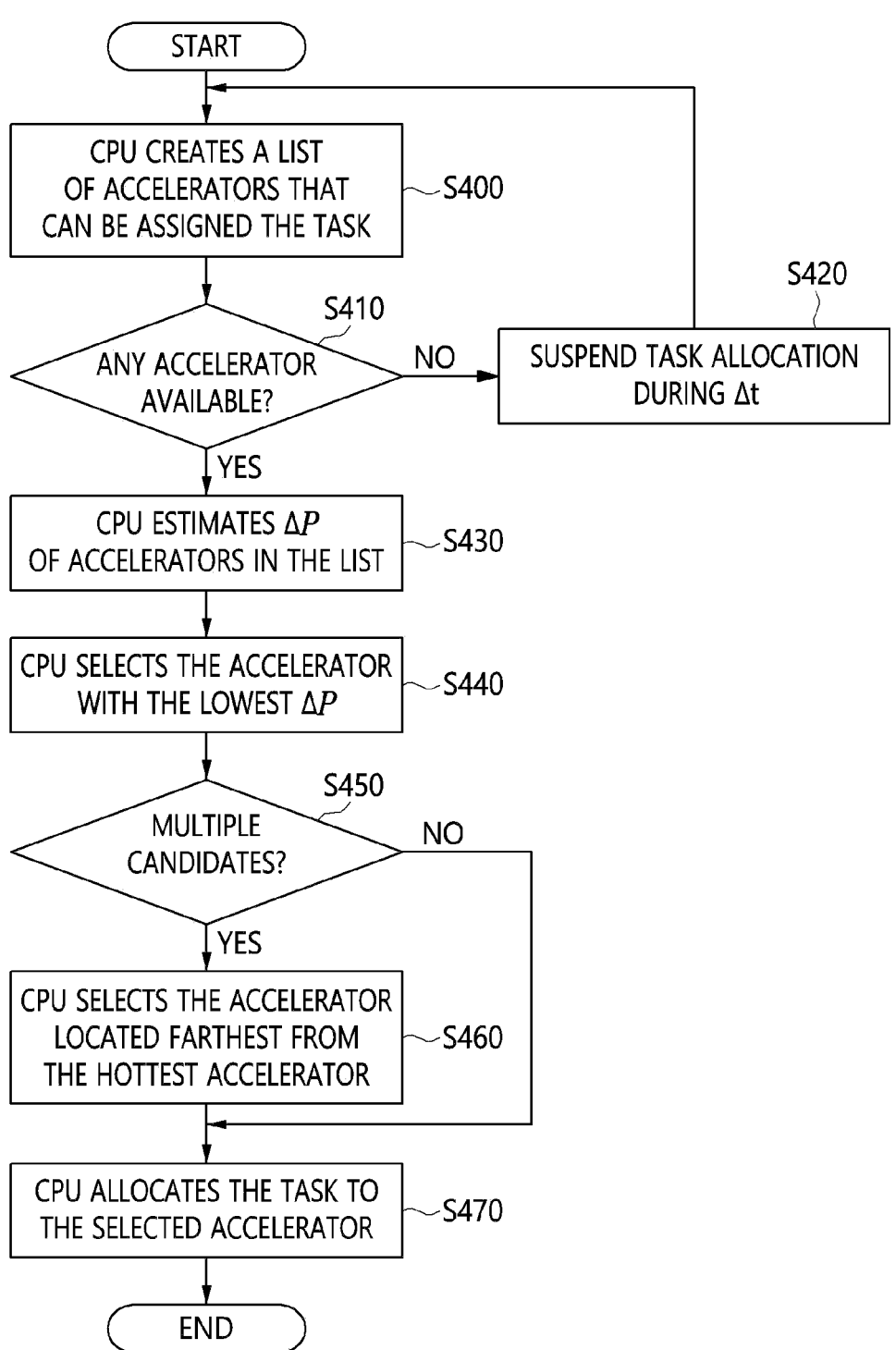
FIG. 4 is a flowchart illustrating a task-scheduling method according to an embodiment of the present disclosure.

FIG. 4 is a flowchart illustrating a task-scheduling method according to an embodiment of the present disclosure.

The task-scheduling method of FIG. 4 may be performed at a system level, and may be initiated whenever a task to be assigned to an accelerator is generated.

When a task to be assigned to a heterogeneous accelerator pool 130 is generated in a host 100, a host processor 110 first generates a list of accelerators capable of being assigned the task in the heterogeneous accelerator pool 130 at step S400. Here, it may be determined that the task can be assigned when the utilization of accelerator logic 160 is equal to or less than a certain level and when the temperature thereof is equal to or less than a certain level. Here, the criteria for the utilization and the temperature may vary depending on a user's definition, and conditions other than the utilization and the temperature may be further taken into account.

The host processor 110 checks at step S410 whether an accelerator capable of being assigned the task is present, and suspends task assignment during a certain time period (Δt) when an accelerator capable of being assigned the task is not present, thereby letting the utilization or temperature of accelerators in the accelerator pool decrease below a certain level at step S420. After the certain time period, the process goes back to the step (S400) of generating a list of accelerators.

When the list of accelerators is generated because accelerators capable of being assigned the task are present, the host processor 110 estimates the amount of power (ΔP) that is to be additionally consumed by each of the accelerators in the list when the task is assigned thereto at step S430. The value of ΔP, which is the amount of power to be additionally consumed by each of the accelerators in the heterogeneous accelerator pool when the task is assigned thereto, may vary depending on the specification of the accelerator, the current load imposed to the accelerator, and the like. When the task is assigned by taking into account only the performance of the accelerator without any consideration of the specification, the current load, and the like, many problems may arise in terms of power efficiency.

The method of estimating ΔP may be implemented in various forms. For example, a method of estimating ΔP in real time using a machine-learning model that receives real-time state information of an accelerator and task information may be used. Here, an operating voltage, a clock frequency, the utilization of accelerator logic, the current temperature of the accelerator, and the like may be considered the state information of the accelerator to be used as the input of an equation. A detailed example of the method of estimating ΔP according to the present disclosure will be described later with reference to FIG. 5.

After it estimates ΔP, the host processor 110 selects the accelerator having the lowest ΔP as the accelerator to which the task is to be assigned at step S440. When multiple candidates for the accelerator capable of being assigned the task are present because multiple accelerators have the same ΔP value or similar ΔP values at step S450, the host processor 110 checks the physical locations of the corresponding accelerators in the heterogenous accelerator pool 130 and selects the accelerator farthest from the accelerator having the highest temperature as the accelerator to be assigned the task at step S460. Due to a very short distance between PCIe slots in a computing node, which is an environment in which the accelerator pool is formed, conductive heat between the accelerators has a great effect on the temperature, and in the present disclosure, the task is assigned to the accelerator farthest from the accelerator having the highest temperature in consideration of the conductive heat, whereby an additional increase in the temperature by conductive heat between the accelerators may be minimized.

After it selects the accelerator to be assigned the task, the host processor 110 assigns the task to the selected accelerator at step S470. After the task is assigned to the accelerator, the task-scheduling method is terminated, and the scheduling method is restarted when a task required to be assigned to the heterogeneous accelerator pool is generated again.

Figure 5:
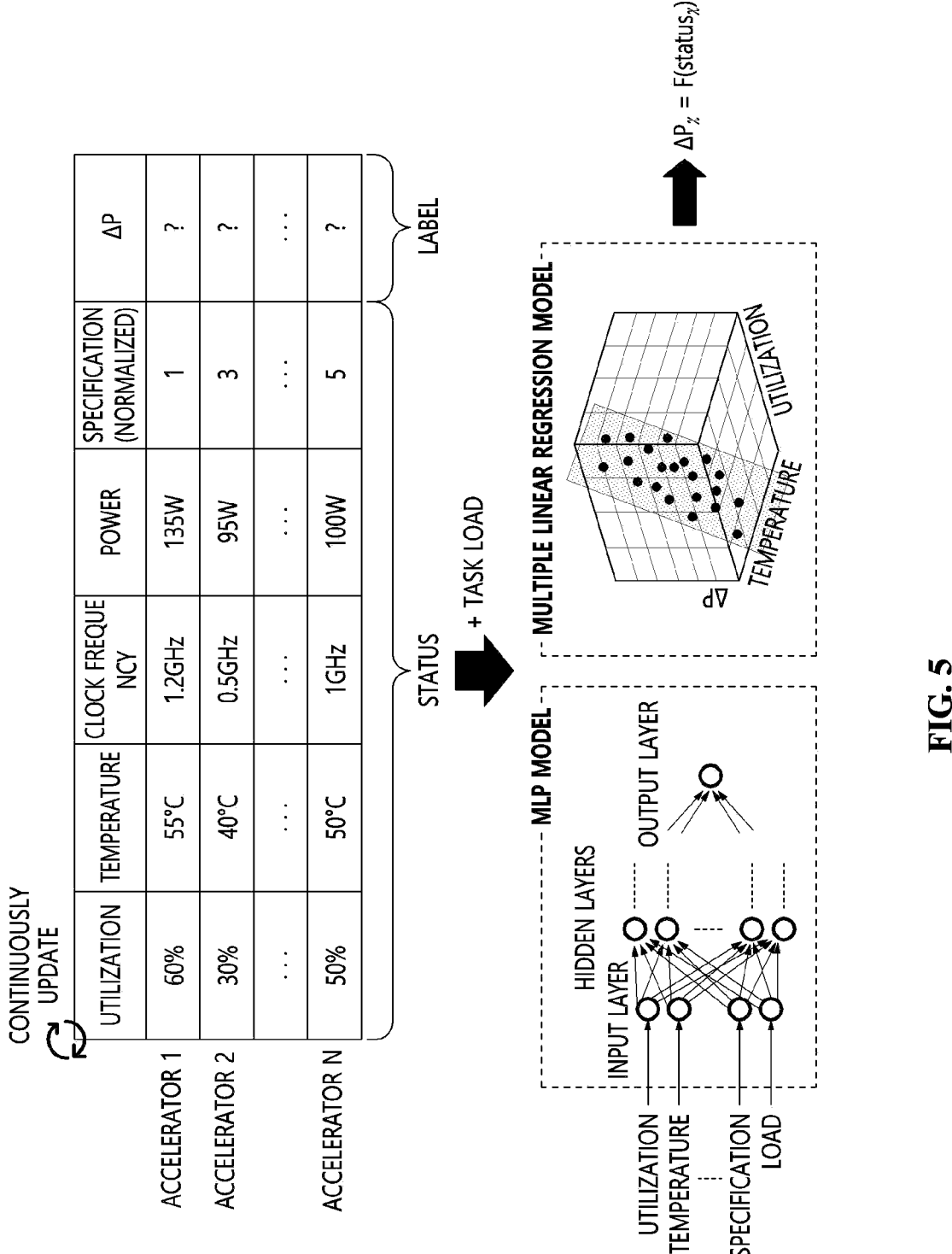
FIG. 5 is an example for explaining a method for estimating variation in power consumption based on a machine-learning model according to an embodiment of the present disclosure.

FIG. 5 is an example for explaining a method for estimating variation in power consumption based on a machine-learning model according to an embodiment of the present disclosure.

Referring to FIG. 5, a host processor 110 continues to collect the state information of accelerators in a heterogenous accelerator pool 130 and stores the state information in the form of a table.

Here, the collected state information of the accelerator may include utilization, temperature, a clock frequency, the current power consumption by the accelerator, and the like.

Then, when a task required to be assigned to the heterogeneous accelerator pool is generated, the host processor 110 checks the load of the task and transfers the same to a machine-learning model that receives the collected accelerator state information and the load of the task as input. The machine-learning model estimates ΔP based on the state information and the load of the task input thereto and transfers the same to the host processor 110.

Here, the machine-learning model that is used may be a Multi-Layer Perceptron (MLP), which is a representative deep-learning-based inference model, or a multiple linear regression model having a relatively simple configuration.

Here, the machine-learning model that is used for estimation of ΔP is required to have been trained before runtime, and the machine-learning model may be trained in advance in the offline phase based on the state information and the like collected through prior profiling.

Figures 6, 7:
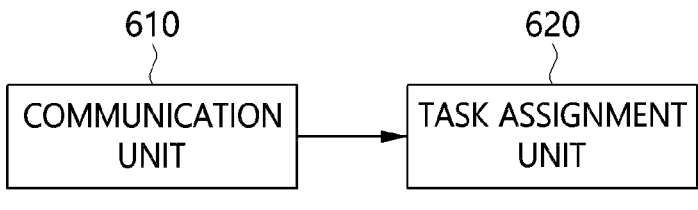
FIG. 6 is an example for explaining a task-scheduling method according to an embodiment of the present disclosure.
FIG. 7 is a block diagram illustrating an apparatus for task scheduling for an accelerator pool according to an embodiment of the present disclosure.

FIG. 6 is an example for explaining a task-scheduling method according to an embodiment of the present disclosure.

Referring to FIG. 6, when a host 100 intends to assign a task to a heterogeneous accelerator pool first (first allocation in FIG. 6), a host processor 110 generates a list of accelerators capable of being assigned the task at step S400 and estimates the ΔP values of the accelerators in the list at step S430. In the example of FIG. 6, when the first task is assigned, the accelerators in the heterogeneous accelerator pool are assumed to be in idle states, rather than executing a task, so all of the accelerators are capable of executing the task. Therefore, ΔP values are estimated for all of the accelerators. Subsequently, the host processor 110 selects the accelerator to be assigned the task depending on the estimated ΔP values at step S440, and because the estimated ΔP value of accelerator 5 is lowest, the task is assigned to accelerator 5 at step S470.

When it intends to assign a task for the second time (second allocation), the host processor 110 generates a list of accelerators capable of being assigned the task at step S400, estimates ΔP values at step S430 as in the first allocation, and selects accelerator 5, the estimated ΔP value of which is lowest, as the accelerator to be assigned the task at step S440. Generally, when an accelerator changes from an idle state to an active state, the amount of power consumed by the accelerator is greatly increased, but when the same task is additionally assigned to the accelerator after the accelerator changes to the active state, an increase in the amount of power consumed thereby is not greater than before.

Subsequently, when a task is intended to be assigned for the third time (third allocation), accelerator 5 is excluded from the list of accelerators capable of being assigned the task at step S400 because the utilization of the accelerator logic 160 of accelerator 5 or the temperature thereof is equal to or greater than a certain level. Therefore, the host processor 110 estimates ΔP values for the remaining accelerators excluding accelerator 5 at step S430. Here, because the estimated ΔP value of accelerator 1 is equal to that of accelerator 4 at step S450, the host processor 110 selects accelerator 1 that is more distant from accelerator 5, which has the highest temperature due to execution of the tasks previously assigned thereto, as the accelerator to be assigned the task in consideration of conductive heat at step S460.

Then, when none of accelerators in the heterogenous accelerator pool is capable being assigned a task (n-th allocation), the host processor 110 suspends assigning a task to the heterogeneous accelerator pool for a certain time period, thereby letting the utilization or temperature of the accelerators decrease below a certain level at step S420.

FIG. 7 is a block diagram illustrating an apparatus for task scheduling for an accelerator pool according to an embodiment of the present disclosure.

Referring to FIG. 7, the apparatus for task scheduling for an accelerator pool according to an embodiment of the present disclosure includes a communication unit 610 for receiving state information of an accelerator in an accelerator pool and a task assignment unit 620 for generating a list of accelerators capable of being assigned a task based on the state information, calculating the amount of additional power to be consumed when the task is assigned to each of the accelerators in the list, and assigning the task to an accelerator in consideration of the calculated amount of additional power to be consumed and conductive heat between accelerators.

Here, the state information may include the logic utilization of the accelerator, an operating voltage, a clock, and temperature information.

Here, the amount of additional power to be consumed may be estimated using the state information of the accelerator and task information.

Here, when an accelerator capable of being assigned the task is not present, the task assignment unit 620 may suspend task assignment until the logic utilization or the temperature of the accelerator decreases to be equal to or less than a preset value.

Here, the task assignment unit 620 may assign the task to an accelerator for which the calculated amount of additional power to be consumed is equal to or less than a preset value, and when there are multiple accelerators for which the amount of additional power to be consumed is equal to or less than the preset value, the task assignment unit 620 may assign the task physically farthest from the accelerator having the highest temperature in the accelerator pool.

Here, the task assignment unit 620 may assign the task to an accelerator for which the calculated amount of additional power to be consumed is equal to or less than a preset value, and may assign the task in consideration of conductive heat generated between accelerators in the accelerator pool.

Here, the accelerator pool may include different types of accelerators.

According to the present disclosure, there may be provided a task-scheduling method that assigns tasks in consideration of the temperature and utilization of an accelerator, an estimate of power to be additionally consumed by the accelerator when a task is assigned thereto, and the physical location of the accelerator in order to reduce heat generation and power consumption by a heterogeneous accelerator pool in a data center.

Also, according to the present disclosure, heat generation and power consumption caused by operating an accelerator pool may be significantly reduced, compared to an existing thermal management method for accelerators, which depends only on air coolers.

Specific implementations described in the present disclosure are embodiments and are not intended to limit the scope of the present disclosure. For conciseness of the specification, descriptions of conventional electronic components, control systems, software, and other functional aspects thereof may be omitted. Also, lines connecting components or connecting members illustrated in the drawings show functional connections and/or physical or circuit connections, and may be represented as various functional connections, physical connections, or circuit connections that are capable of replacing or being added to an actual device. Also, unless specific terms, such as "essential", "important", or the like, are used, the corresponding components may not be absolutely necessary.

Accordingly, the spirit of the present disclosure should not be construed as being limited to the above-described embodiments, and the entire scope of the appended claims and their equivalents should be understood as defining the scope and spirit of the present disclosure.

What is claimed is:

1. A method for task scheduling for an accelerator pool, performed by an apparatus for task scheduling, comprising:
    receiving state information of an accelerator in the accelerator pool;
    generating a list of accelerators capable of being assigned a task based on the state information;

calculating an amount of additional power that is to be consumed when the task is assigned to each of the accelerators in the list; and assigning the task to an accelerator in consideration of the calculated amount of additional power to be consumed and conductive heat between accelerators, wherein the state information includes a logic utilization of the accelerator, an operating voltage, a clock, and temperature information, wherein assigning the task to the accelerator comprises:

assigning the task to an accelerator for which the calculated amount of additional power to be consumed is equal to or less than a preset value, and assigning the task to an accelerator physically farthest from an accelerator having a highest temperature in the accelerator pool when there are multiple accelerators for which the amount of additional power to be consumed is equal to or less than the preset value.

2. The method of claim 1, wherein the amount of additional power to be consumed is estimated using the state information of the accelerator and task information.

3. The method of claim 1, wherein generating the list of accelerators comprises suspending task assignment until a logic utilization of the accelerator or a temperature of the accelerator decreases to be equal to or less than a preset value when an accelerator capable of being assigned the task is not present.

4. The method of claim 1, wherein assigning the task to the accelerator comprises:

assigning the task to an accelerator for which the calculated amount of additional power to be consumed is equal to or less than a preset value, and assigning the task in consideration of the conductive heat generated between accelerators in the accelerator pool.

5. The method of claim 1, wherein the accelerator pool includes different types of accelerators.

6. An apparatus for task scheduling for an accelerator pool, comprising:

a communication unit for receiving state information of an accelerator in the accelerator pool; and a task assignment unit for generating a list of accelerators capable of being assigned a task based on the state information, calculating an amount of additional power that is to be consumed when the task is assigned to each of the accelerators in the list, and assigning the task to an accelerator in consideration of the calculated amount of additional power to be consumed and conductive heat between accelerators, wherein the state information includes a logic utilization of the accelerator, an operating voltage, a clock, and temperature information, wherein the task assignment unit assigns the task to an accelerator for which the calculated amount of additional power to be consumed is equal to or less than a preset value and assigns the task to an accelerator physically farthest from an accelerator having a highest temperature in the accelerator pool when there are multiple accelerators for which the amount of additional power to be consumed is equal to or less than the preset value.

7. The apparatus of claim 6, wherein the amount of additional power to be consumed is estimated using the state information of the accelerator and task information.

8. The apparatus of claim 6, wherein the task assignment unit suspends task assignment until a logic utilization of the accelerator or a temperature of the accelerator decreases to be equal to or less than a preset value when an accelerator capable of being assigned the task is not present.

9. The apparatus of claim 6, wherein the task assignment unit assigns the task to an accelerator for which the calculated amount of additional power to be consumed is equal to or less than a preset value and assigns the task in consideration of the conductive heat generated between accelerators in the accelerator pool.

10. The apparatus of claim 6, wherein the accelerator pool includes different types of accelerators.

* * * * *